No. 858,663. PATENTED JULY 2, 1907.
P. O. PEDERSEN.
RECEIVER FOR ELECTRICAL OSCILLATIONS.
APPLICATION FILED JUNE 28, 1906.
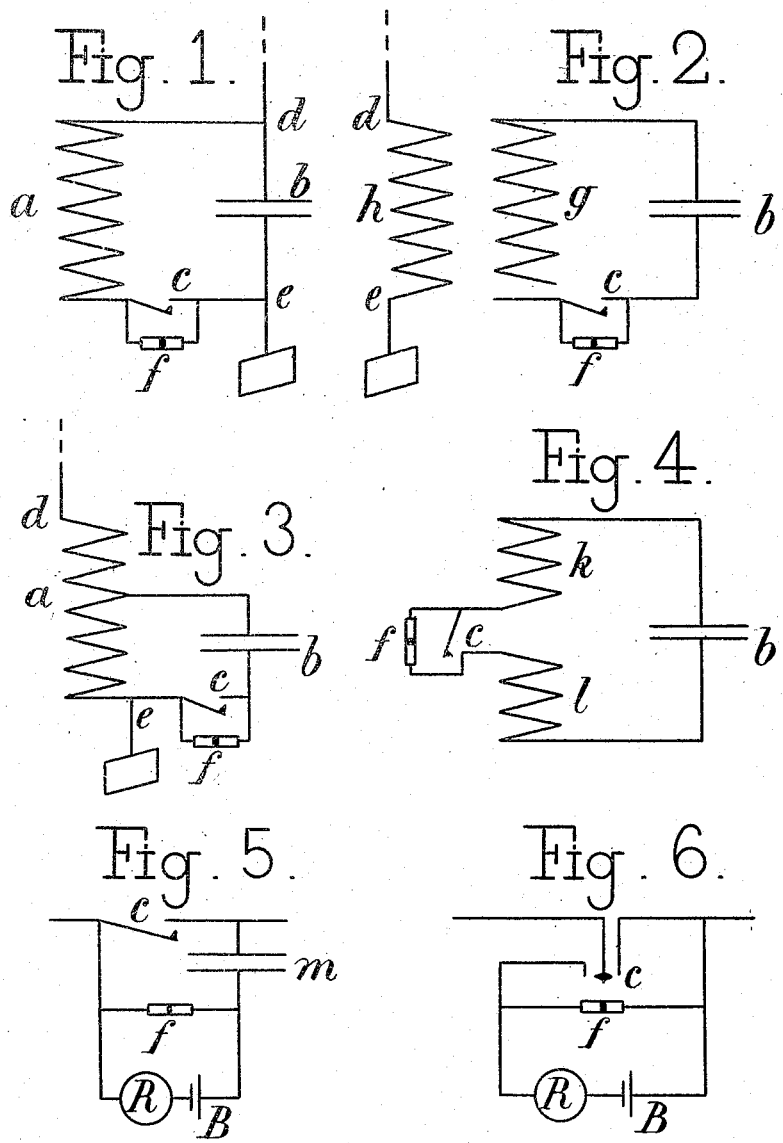
Witnesses:
Waldo M Chapin
William Dorman
Inventor:
Peder O. Pedersen.
by Rosenbaum & Stockbridge
Attys.

UNITED STATES PATENT OFFICE.

PEDER OLUF PEDERSEN, OF COPENHAGEN, DENMARK.

RECEIVER FOR ELECTRICAL OSCILLATIONS.

No. 858,668.  Specification of Letters Patent.  Patented July 2, 1907.

Application filed June 28, 1906. Serial No. 323,904.

*To all whom it may concern:*

Be it known that I, PEDER OLUF PEDERSEN, a subject of the King of Denmark, residing at Copenhagen, Denmark, have invented certain new and useful Improvements in Receivers for Electrical Oscillations, of which the following is a full, clear, and exact description.

In the wireless transmission of signals a certain type of apparatus has been proposed in which continuous rather than intermittent oscillations are emanated from the transmitting station. With this system a practical difficulty arises on account of the fact that the ordinary types of wave indicator do not possess a well defined resistance so that their presence in the circuit of vibrations impedes the correct tuning or resonance which would otherwise be secured. This may be overcome by arranging the receiver system so that the detector or wave indicator is only intermittently connected to the circuit of vibration. In the present application I have described and claimed an apparatus for securing this result.

In addition to the advantage that the wave indicator is only intermittently connected with the circuit of vibration, the present invention also attains the further advantage that the energy of the current of vibration is transformed into a higher potential and at the desired moment is impelled through the wave indicator in the form of an accumulated charge. Both of these conditions contribute considerably toward increasing the sensitiveness of the receiver.

In the drawings, Figure 1 is a diagrammatic view showing the receiving circuit of wireless system embodying the principles of my invention. Fig. 2 is a similar view showing a slight modification. Fig. 3 shows an additional modification. Figs. 4, 5 and 6 show still further modified forms of the invention.

In the form of the invention shown in Fig. 1 $a$ denotes a reactance coil and $b$ a condenser, which together form the circuit of vibration for the received wireless impulses. $c$ denotes a contact device or circuit interrupting key. This key or contact device is bridged by a detector $f$ of any ordinary or approved construction. The antenna and the earth contacts are respectively made at $d$ and $e$.

If the contact $c$ is closed, vibrations will occur in the circuit of vibration whenever the antenna intercepts the electric waves or wireless impulses. The electric currents of vibration in this antenna circuit will resonate with the wireless impulses and increase to a high intensity or amplitude. At this moment the contact $c$ is interrupted which decreases the capacity of the system, and at the same time the wave indicator is thrown into the circuit and powerfully acted upon. This action on the detector or wave indicator is powerful, partly on account of the heavy currents obtained by the effect of resonance as above mentioned, and partly on account of the increase in the potential, due to the decrease in the capacity of the system, which results from opening the contact $c$.

In the diagram shown in Fig. 2, the electric vibrations are induced from a primary winding $h$ to a secondary coil $g$, which together with the condenser $b$, forms the circuit of vibration.

In the form of the invention shown in Fig. 3 a virtual combination of the forms of the invention shown in Figs. 1 and 2 is effected. In this case the reactance $a$ is made part of an auto-coil.

In the form of the invention shown in Fig. 4 the reactance coil is divided into two parts $k$ and $l$ by the contact device $c$. This produces a perfectly symmetrical arrangement.

Figs. 5 and 6 show how the relay circuit may be advantageously arranged. The relay is indicated at R and the battery at B. With the form of arrangement shown in Fig. 5 the relay circuit is not closed through the contact $c$ on account of the condenser $m$.

Fig. 6 shows a contact device $c$ arranged in such a manner that at one position of its throw it closes the circuit of vibration and opens such circuit at another position, after which it can close connection with a wave indicator so that this is actuated by the circuit of vibration changed in the manner stated above.

What I claim is:

A receiving apparatus for a wireless system comprising a circuit of vibration having inductance and capacity therein, said circuit having a contact device adapted to close the circuit of vibration directly at one position of its throw, and a divided circuit including a wave indicator and adapted to be included in the circuit at the other position of throw on said contact device.

In witness whereof, I subscribe by signature, in the presence of two witnesses.

PEDER OLUF PEDERSEN.

Witnesses:
 CECIL VILHELM SCHON,
 VIGGO BLOM